(12) United States Patent
Evans et al.

(10) Patent No.: US 12,547,523 B2
(45) Date of Patent: Feb. 10, 2026

(54) PAGE ACCESS FREQUENCY TRACKING

(71) Applicant: Arm Limited, Cambridge (GB)

(72) Inventors: Matthew Lucien Evans, Cambridge (GB); Robert Gwilym Dimond, Cambridge (GB); Alexander Donald Charles Chadwick, Cambridge (GB)

(73) Assignee: Arm Limited, Cambridge (GB)

( * ) Notice: Subject to any disclaimer, the term of this patent is extended or adjusted under 35 U.S.C. 154(b) by 86 days.

(21) Appl. No.: 18/577,972

(22) PCT Filed: Jun. 10, 2022

(86) PCT No.: PCT/GB2022/051454
§ 371 (c)(1),
(2) Date: Jan. 9, 2024

(87) PCT Pub. No.: WO2023/285774
PCT Pub. Date: Jan. 19, 2023

(65) Prior Publication Data
US 2024/0354216 A1  Oct. 24, 2024

(30) Foreign Application Priority Data

Jul. 16, 2021 (GB) ..................... 2110258

(51) Int. Cl.
*G06F 12/1009* (2016.01)
*G06F 11/34* (2006.01)
*G06F 12/1027* (2016.01)
(52) U.S. Cl.
CPC ...... *G06F 11/3471* (2013.01); *G06F 12/1009* (2013.01); *G06F 12/1027* (2013.01)

(58) Field of Classification Search
None
See application file for complete search history.

(56) References Cited

U.S. PATENT DOCUMENTS

2006/0265552 A1* 11/2006 Davis .................. G06F 12/0862
711/137
2008/0263341 A1* 10/2008 Ozer ..................... G06F 9/3832
712/239

(Continued)

OTHER PUBLICATIONS

Combined International Search and Examination Report for International Application No. GB2110258.7 dated Apr. 14, 2022.

(Continued)

*Primary Examiner* — Stephanie Wu
(74) *Attorney, Agent, or Firm* — NIXON & VANDERHYE P.C.

(57) ABSTRACT

An apparatus comprises: memory access circuitry (11) to process memory access requests requesting access to a memory system (10, 32); and access frequency tracking circuitry (40). In response to a given memory access request requesting access to a given page of a memory address space, the access frequency tracking circuitry (40) determines an outcome of a chance-dependent test, where the outcome of the chance-dependent test is dependent on chance. When the outcome of the chance-dependent test is a first outcome, an access frequency tracking indicator corresponding to the given page is updated within an access frequency tracking structure. When the chance-dependent test has an outcome other than the first outcome, the access frequency tracking circuitry 40 omits updating of the access frequency tracking indicator corresponding to the given page.

20 Claims, 8 Drawing Sheets

(56) References Cited

U.S. PATENT DOCUMENTS

| | | |
|---|---|---|
| 2012/0317338 A1* | 12/2012 | Yi .......................... G06F 3/061 |
| | | 711/E12.001 |
| 2015/0046653 A1* | 2/2015 | Soundararajan .... G06F 12/0811 |
| | | 711/146 |
| 2018/0046378 A1 | 2/2018 | Coburn et al. |
| 2019/0102312 A1* | 4/2019 | McDonnell ......... H04L 67/1097 |
| 2019/0213131 A1* | 7/2019 | Sabba ................. G06F 12/0862 |
| 2019/0251275 A1* | 8/2019 | Ramrakhyani ..... G06F 21/6218 |
| 2020/0192809 A1* | 6/2020 | Mappouras ......... G06F 12/0261 |
| 2020/0409585 A1* | 12/2020 | Koufaty ................ G06F 3/0647 |
| 2022/0237124 A1* | 7/2022 | Gottin ................ G06F 12/0882 |

OTHER PUBLICATIONS

International Search Report and Written Opinion for International Application No. PCT/GB2022/051454, dated Sep. 14, 2022.
Agarwal et al., "Thermostat: Application-transparent Page Management for Two-tiered Main Memory," University of Michigan, 2017.
Yu et al., "Banshee: Bandwidth-Efficient DRAM Caching via Software/Hardware Cooperation," p. 1-14, 2017.

* cited by examiner

PAGE ACCESS FREQUENCY TRACKING

The present technique relates to the field of data processing.

In a data processing system, it can be useful to provide a mechanism for tracking the relative frequency with which respective pages of a memory address space are accessed. This can be useful, for example, for determining how virtual addresses should be mapped to physical addresses, as the access frequency tracking information can be used to identify more frequently accessed pages of the address space which may be mapped to portions of the memory system which can be accessed faster, with less frequently accessed pages being allocated to portions of the memory system which are slower to access.

At least some examples provide an apparatus comprising: memory access circuitry to process memory access requests requesting access to a memory system; and access frequency tracking circuitry responsive to a given memory access request requesting access to a given page of a memory address space, to: determine an outcome of a chance-dependent test, where the outcome of the chance-dependent test, when determined for the given memory access request, is dependent on chance; when the outcome of the chance-dependent test is a first outcome, update an access frequency tracking indicator corresponding to the given page within an access frequency tracking structure; and when the outcome of the chance-dependent test is an outcome other than the first outcome, omit updating of the access frequency tracking indicator corresponding to the given page.

At least some examples provide a method for tracking frequency of access to one or more pages of a memory address space, the method comprising: in response to a given memory access request requesting access to a given page of the memory address space: determining an outcome of a chance-dependent test, where the outcome of the chance-dependent test, when evaluated for the given memory access request, is dependent on chance; when the outcome of the chance-dependent test is a first outcome, updating an access frequency tracking indicator corresponding to the given page within a access frequency tracking structure; and when the outcome of the chance-dependent test is an outcome other than the first outcome, omitting updating of the access frequency tracking indicator corresponding to the given page.

Further aspects, features and advantages of the present technique will be apparent from the following description of examples, which is to be read in conjunction with the accompanying drawings, in which:

FIG. 1 schematically illustrates an example of a data processing system;

Figure 12:
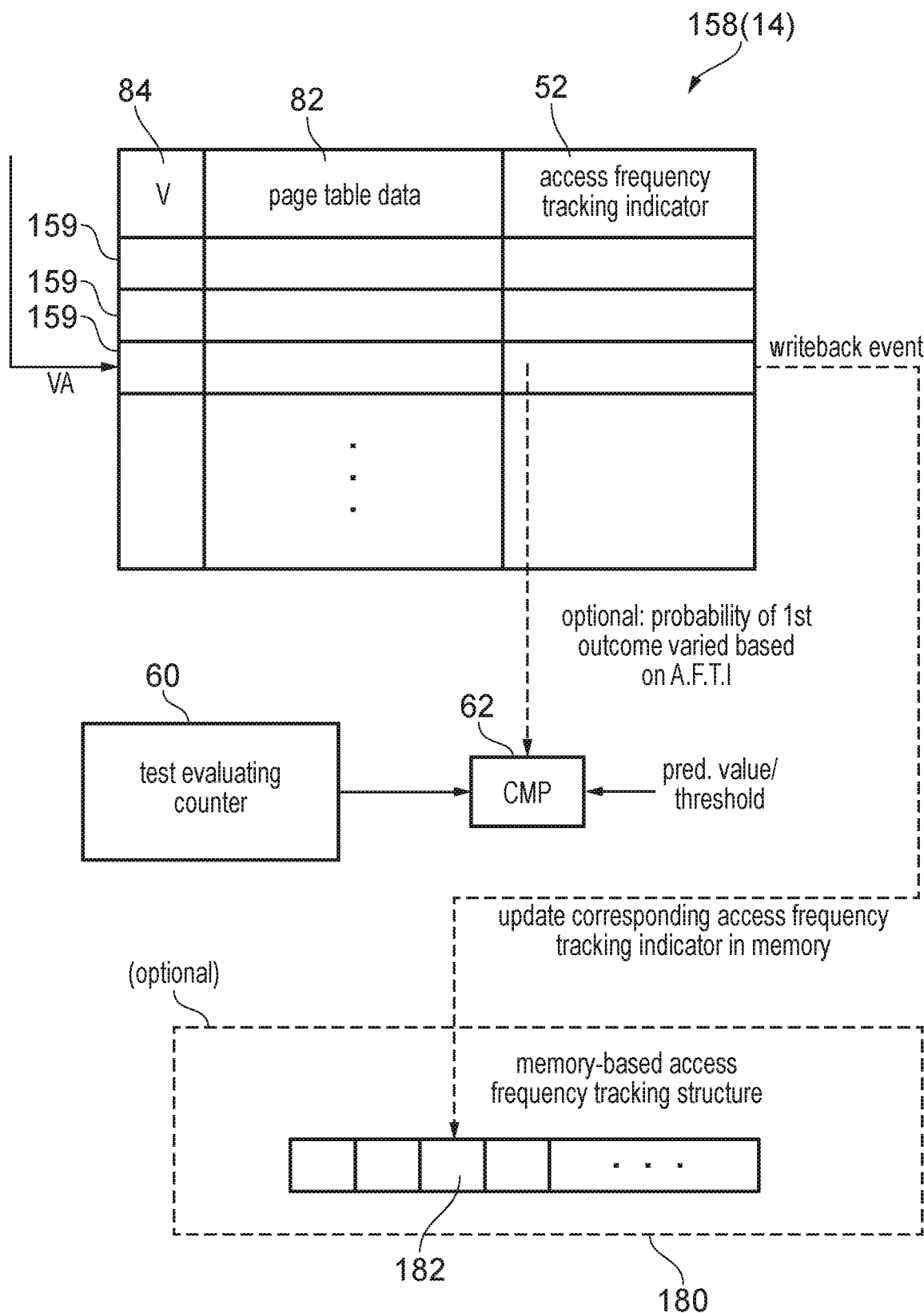
Figure 13:
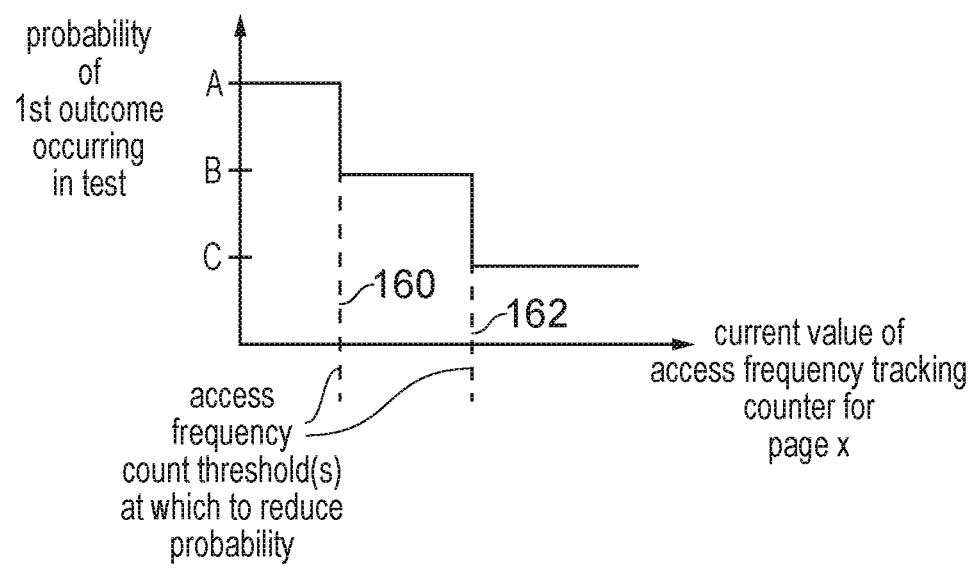

FIG. 12 shows an example where the access frequency tracking indicator for a given page is stored in an access frequency tracking hardware structure (e.g. a translation lookaside buffer); and FIG. 13 schematically illustrates reducing a probability of the chance-dependent test providing a first outcome when the access frequency tracking indicator for a given page indicates that an estimated frequency of accesses to the given page has reached or exceeded a certain threshold.

One approach for tracking frequency of access to pages of an address space may be to set a flag in a page table entry associated with a given page when the page is accessed or modified. However, this may merely distinguish pages that are never accessed at all from pages accessed at least once. The flag could be extended to be a counter, but typically there are not many bits spare in a page table entry. The inventors have recognized that for some purposes it may be useful to be able to distinguish pages accessed a very large number of times from pages accessed a smaller number of times (e.g. to distinguish a pages accessed in the order of 100-1000 times per second from those accessed in the order of ~1 million times per second. However, maintaining counters with sufficient number of bits to track this number of accesses per page can be costly in terms of performance, memory overhead and/or circuit area.

In the examples described below, an apparatus has memory access circuitry to process memory access requests requesting access to a memory system, and access frequency tracking circuitry responsive to a given memory access request requesting access to a given page of a memory address space, to determine an outcome of a chance-dependent test. The outcome of the chance-dependent test, when determined for the given memory access request, is dependent on chance. When the outcome of the chance-dependent test is a first outcome, an access frequency tracking indicator corresponding to the given page is updated within an access frequency tracking structure. However, when the chance-dependent test provides an outcome other than the first outcome, updating of the access frequency tracking indicator corresponding to the given page is omitted.

Hence, rather than updating an access frequency tracking indicator every time there is an access to the corresponding page, the update to the access frequency tracking indicator is only updated some of the time, depending on whether a chance-dependent test provides a first outcome or another outcome. The chance-dependent test may be analogous to a dice roll or a lottery draw, providing a certain probability of having the first outcome where it is a matter of chance whether the first outcome will occur for any given instance of a memory access request. Even if two memory access requests are controlled based on identical memory access control parameters (e.g. same target address, same type of memory access, same permissions set in a page table entry, same execution mode or operating state of the processor at the time of issuing the memory access requests, and the same control settings set in any control registers for configuring the way in which memory access requests are processed, etc.) then the chance-dependent test may nevertheless provide the first outcome for one of those requests and provide a different outcome for another of those requests.

Hence, whether the chance-dependent test provides the first outcome, and therefore whether the access frequency tracking indicator corresponding to the given page is updated, depends on chance. One may see this as counter-intuitive since this could lead to increased inaccuracy in the access frequency tracking since it would be possible for the chance-dependent test to yield the first outcome on the very first access to a given page that had never been accessed before, but provide another outcome every time a more frequently accessed page is accessed, so it may mean that the access frequency tracking structure may identify some pages as accessed more frequently than they really were. However, the inventors recognised that, statistically, the more frequently accessed pages are more likely to encounter an instance when the chance-dependent test yields the first outcome than less frequently accessed pages. Effectively the more frequently accessed pages are given a larger number of "rolls of the dice" compared to less frequently accessed pages, and so the probability is higher that eventually the more frequently accessed page will have its access frequency tracking indicator updated. Hence, occasional false positives are unlikely to skew the tracking information provided by the access frequency tracking structure by a significant amount.

An advantage of using the chance-dependent test to control whether the access frequency tracking indicator is updated for an accessed page is that this allows the circuit area, power and performance cost to be reduced, even if the aim is to track page access frequency over a wide range of orders of magnitude of numbers of accesses. By implementing a chance-dependent test so that the probability of the tracking indicator being updated is reduced for any particular memory access to a given page, this means that a smaller counter or other tracking indicator can be employed while simulating counting over a larger absolute range of access frequency. This allows useful information on the approximate relative frequency of access for different pages to be tracked with much less cost in terms of circuit area, power and performance.

The chance-dependent test may have a software-configurable probability of providing the first outcome. Hence, software may set the probability with which the access frequency tracking indicator is updated on a memory access request to the corresponding page. For example, the probability of the test providing the first outcome could be defined as 1 in N where the value of N is variable depending on a configuration value selected by software.

In some cases the right to configure the probability of the chance-dependent test providing the first outcome may be restricted to software having a certain level of privilege or higher. Software operating at a privilege less than a threshold level of privilege may not be allowed to configure the probability.

In one example, the software-configurable probability of providing the first outcome may be specified in a software-configurable register. Hence, software can adjust the probability by updating the software-configurable register.

Other examples could provide control state within page tables or another memory-based structure, that software can update to control the probability with which the chance-dependent test provides the first outcome.

In some examples, the software-configurable probability of providing the first outcome in the chance-dependent test could depend on a software-configured global parameter shared between all memory access requests.

Also, it is possible to provide at least one software-configured local parameter, which is specific to a particular subset of memory access requests including the given memory access request, and which controls the probability of the chance-dependent test providing the first outcome for that particular subset of memory access requests. For example the local parameter could be specific to a particular type of access (e.g. whether the access is a privileged or unprivileged access, or whether the access is a load or a store) or could be specific to memory access requests issued in a particular execution mode or state. Also, software-configured local parameters could be provided which are specific to particular regions of the address space. Hence, the probability of the chance-dependent test providing the first outcome can be adjusted independently for different subsets of memory accesses. If local parameters are defined for controlling the probability then these can be set in software-configurable registers or in data structures in memory.

Setting independent probabilities for different subsets of memory access requests can be useful, as it allows some subsets of memory access requests to be prioritized over others when the tracking information is used by software (e.g. to determine address mappings). For example, software may wish to set a higher probability of the first outcome arising for a first subset of accesses (e.g. secure/privileged accesses) compared to a second subset (e.g. less secure/privileged access), so that the apparent number of accesses represented by the access frequency tracking structure is skewed in comparison to the actual number of accesses for the first/second subsets of accesses, in favour of the first subset. When the access frequency tracking structure is later used by software to control the memory map so that the more frequently accessed pages can be allocated to faster portions of the memory system, this can increase the likelihood that the first subset of accesses can be made with higher performance, to take account of the software's preferred prioritization scheme. This can simplify the software's analysis of the access frequency tracking information, as if the prioritization is already factored in at the time the access frequency tracking structure is updated, there is less need for the analysis software algorithm to combine the access frequency tracking information with other information about the type of memory access. Hence, by supporting in hardware the ability for software to set independent probabilities for different subsets of memory access, this can lead to practical benefits for software developers in simplifying their code for analyzing the access frequency tracking information.

Some examples may use a combination of a software-configured global parameter and one or more software-configured local parameters to control the probability of the chance-dependent test providing the first outcome. For example a global parameter could set a default probability, but one or more software-configured local parameters could specify a different probability for certain subsets of memory access requests or specify an adjustment to the default probability to be used for that subset of access requests.

In some examples the probability of the chance-dependent test providing the first outcome for a particular subset of memory access requests may remain constant regardless of the number of accesses encountered previously since tracking started.

However, in other approaches, the probability of the chance-dependent test providing the first outcome may be variable over time depending on the number of accesses to a given page. For example, the access frequency tracking circuitry may set a probability of the chance-dependent test providing the first outcome separately for different pages of the memory address space, and in response to a determination that a frequency of accesses to the given page has reached or exceeded a predetermined threshold, the access frequency tracking circuitry may reduce a probability of the chance-dependent test providing the first outcome on subsequent instances of a memory access request requesting access to the given page. Note that, as the access frequency tracking information may be set on a statistical basis based on the chance-dependent test as described above, the determination that the frequency of accesses has reached/exceeded a threshold may not be precise—it could be a determination that an estimated frequency of accesses has reached/exceeded or threshold, and while that estimate may provide an approximate indication of relative frequency which on average may be a reasonable estimate, that estimate may not be correct in each specific instance.

In general, reducing the probability of the test giving the first outcome with increasing numbers of accesses to a given page can be useful to implement a non-linear scaling between the estimated number of accesses represented by the access frequency tracking indicator and the actual value of the access frequency tracking indicator used to represent that number of accesses. This again can help to reduce the overall size of the counter needed to track accesses over a wider range of magnitude. For example, in some use cases it may be useful to be able to distinguish pages which have never been accessed from pages that have been accessed at least once, but then once a page has been accessed at least once then it may not be useful to be able to distinguish whether it has been accessed once, twice, three times etc. until the number of accesses has got to a much larger value. Similarly, once a page has been accessed a certain number of times (e.g. 100 or 1000), the next boundary beyond which it is interesting to identify pages accessed more than that number of times may not be until the page access count has reached hundreds of thousands or millions of times. Hence, there may be a number of threshold points of interest, but they may not be evenly distributed. By reducing the probability of the chance-dependent test providing the first outcome for accesses to a given page as the number of accesses to that page increases, this can be useful to allow a smaller counter to track a wider range so that the limited granularity of the frequency tracking indicator can be used more efficiently.

The chance-dependent test can be implemented in various ways. The chance-dependent test may have a probability of less than 1 of providing the first outcome. The chance-dependent test may depend on information or a signal which is not controllable by software which causes the given memory access request to be issued. In some cases, issuing exactly the same memory access request on different occasions may lead to different outcomes of the chance-dependent test, even if all properties of the memory access request and the software-defined parameters for controlling whether the memory access request can be allowed are identical.

In one specific example (not the only example) the chance-dependent test comprises determining whether a test evaluating counter, provided for counting memory access requests, satisfies a predetermined condition. The test evaluating counter can be any piece of information that has a number of states and is advanced from state to state in response to each memory access request which meets at least one criterion for advancing the counter, and which may be determined to satisfy the predetermined condition once the test evaluating counter has been advanced in state a certain number of times after being reset to an initial state. For example, the test evaluating counter could be a binary integer which is incremented or decremented each time a relevant memory access request is encountered and which may be considered to satisfy the predetermined condition once the test evaluating counter reaches a predetermined value or passes a given threshold. However, it is not essential for counters to be represented as binary integers, and another example could provide a shift register which is shifted to its next state in response to each memory access request meeting the at least one criterion for advancing the counter, so that the shift register cycles between a certain sequence of states and satisfies the predetermined condition once it reaches a predetermined state within its cycle. For example the shift register could comprise a certain number of bits having a first value (0 or 1) and one bit having a second value (the other of 0 and 1), and could be considered to satisfy the predetermined condition once the single bit having a different value to all the other bits has been shifted into a particular position within the shift register, with the shift register being shifted by one position each time a memory access request meeting the advancement criteria is encountered. Of course, these are just some specific ways of implementing a test evaluating counter, and other options can also be used.

In general, by providing a test evaluating counter for evaluating the chance-dependent test, this can provide a simple method of implementing evaluation of a chance-dependent test. Whether the test evaluating counter meets the predetermined condition when a given memory access request is processed may be viewed as a matter of chance since it depends not on the properties of that particular memory access request, but also on apparently random occurrences such as the number of requests previously encountered and the relative ordering of memory access requests, which may typically be out of the control of the software issuing the memory access request, so that from the software's point of view whether the test evaluating counter satisfies the predetermined condition can be seen as an essentially random event providing a 1 in N chance of providing the first outcome, where N is the number of states which the counter traverses between initialization and reaching the state in which the condition is satisfied.

In some examples, the test evaluating counter could be a global counter shared between all memory access requests, regardless of which page is accessed by the memory access request. This can be less costly to implement in terms of circuit area and power.

Alternatively, the test evaluating counter could be one of a number of local counters each for counting memory access requests of a specific subset, and the chance-dependent test performed when a given memory access request is processed may be based on the local counter which corresponds to the specific subset of memory access requests that includes the given memory access request. For example, different local counters could correspond to specific subsets of memory access requests associated with different operating modes or execution states (e.g. distinguishing privileged accesses from less privileged accesses, or distinguishing secure accesses from less secure accesses). Also it is possible to provide different local counters corresponding to loads and stores respectively, so that load requests (requesting transfer of data from memory to registers) and store requests (requesting transfer of data from registers to memory) have their chance-dependent test evaluated based on different counters. In another option, local counters may be provided corresponding to specific regions or pages of the memory address space, so that memory access requests to one region or page may have their chance-dependent test evaluated based on a different counter to memory access request targeting a different region or page. In the case of page-specific local counters, a convenient structure for tracking the local counters can be within a translation lookaside buffer (TLB) which stores address translation entries corresponding to respective pages, where the address translation entry for a given page may include the local counter corresponding to the given page. This can help to reduce circuit area and power consumption by avoiding the need for a further lookup to a separate structure, as an existing TLB lookup can be used to identify the local test evaluating counter for the current accessed page. Nevertheless, it would also be possible to implement a structure separate to the TLB for providing region/page-specific local test evaluating counters.

Providing separate local test evaluating counters specific to individual regions/pages of the memory address space can increase the accuracy of the access frequency tracking, so that the estimated access frequency represented by the access frequency tracking indicator for a given page can be more closely correlated with the actual number of accesses to that page, since it reduces the likelihood of false positives caused by an access to a region/page not previously accessed causing the first outcome of the chance-dependent test.

A test evaluating counter is not the only way of implementing the chance-dependent test. In another example the chance-dependent test may comprise determining whether a portion of bits has a predetermined value, where the portion of bits comprises bits sampled from one or more items of internal control information of the apparatus, or from a serial pulse train derived from one or more analog or digital signals of the apparatus. In some cases it may not be necessary to maintain any specific state (such as a counter) specifically for the implementation of the chance-dependent test, since there may be existing signals or information within the data processing apparatus (that have other purposes other than access frequency tracking) which could be sampled or reused to provide values which may vary approximately randomly according to some probability and so which could be sampled and compared with a predetermined value to determine whether the test is satisfied or not. For example, a processing apparatus may have internal counters for counting events such as elapsed clock cycles, cache misses or other events for performance monitoring, and some bits of those counters could be interpreted as a pulse train of evenly spaced events having a particular probability. In other examples a serial pulse train could be derived from multiple pieces of internal state or physical signals that may be substantially independent from each other but can be combined in a way that the resulting pulse train (sequence of bits sampled based on successive values of the state/signal over time) can be considered effectively random and then the access frequency tracking circuitry could evaluate whether those bits meet a certain condition (such as including a certain number of 1s in a row). It is not essential for digital signals to be used as the source of the pulse train. Analogue signals, such as a random bit stream from a diode or interference patterns between unrelated signals, could also be used. For example mixing (XOR) of two clock signals may give a beat frequency at the common factor of the respective clock frequencies and multiple such sources could be mixed to give a pulse train that is approximately random. Hence, there may be many options by which the sampled bits used to evaluate the chance-dependent test can be obtained, e.g. using existing analog or digital signals or information available within the processing apparatus.

In another example, the chance-dependent test may comprise determining whether a random or pseudorandom number has a predetermined value. Some systems may already have a random number generator or pseudorandom number generator for other purposes (such as encryption) and so that existing source of randomness could be exploited to provide a number of bits which may be compared with some predetermined value to determine whether the chance-dependent test provides the first outcome or a different outcome.

The access frequency tracking structure, which is updated when the chance-dependent test is determined to have the first outcome for a given memory access request, may also be implemented in a number of different ways.

In some examples the access frequency tracking indicator may comprise a tracking flag (e.g. a single-bit flag) which can have one of a first value or a second value. When the outcome of the chance-dependent test is the first outcome and the tracking flag corresponding to the given page has a first value, the access frequency tracking circuitry may update the tracking flag corresponding to the given page to specify a second value. Hence, in this case a one-bit flag may be sufficient to represent the access frequency tracking indicator, which can reduce the cost of implementing the access frequency tracking structure. Since the chance-dependent test provides a certain probability 1/p of providing the first outcome, the tracking flag being set to the second value may indicate that the probability that more than a certain number of accesses p have been made to that page is greater than ½, for example.

In other examples, the access frequency tracking indicator may comprise a multi-bit access frequency tracking counter. Note that this is a different counter to the test evaluating counters described earlier which is used to decide whether the chance-dependent test has provided the first outcome or not. The access frequency tracking counter is an indicator within the access frequency tracking structure which is updated in the case when the outcome of the chance-dependent test is the first outcome. Hence, when the outcome of the chance-dependent test is the first outcome, the access frequency tracking circuitry may increment the multi-bit access frequency tracking counter corresponding to the given page. It will be appreciated that the counter may saturate at a given value so once it has reached the saturation value then further increments may not be performed even if the page is accessed again when the chance-dependent test provides the first outcome. By providing a multi-bit counter as the access frequency tracking indicator this can allow a wider range of access frequency to be tracked. Nevertheless, as updating the counter is dependent on a test outcome which depends on chance, the size of the counter can be much smaller than in an implementation where the counter was incremented every time the page is accessed.

The access frequency tracking structure can be implemented in different ways.

In some implementations the access frequency tracking structure may comprise access frequency tracking indicators at a granularity of individual pages, so that different access frequency tracking indicators are provided for different pages of the address space. It is not essential for the access frequency tracking structure to have a corresponding access frequency tracking indicator for every page. For example, currently unmapped pages of the address space need not have a corresponding tracking indicator, depending on the implementation of the structure. By providing access frequency tracking indicators on a page by page basis this may provide finer grained tracking of access frequency to allow more informed decisions on page mappings.

However, in other examples the access frequency tracking indicators could be defined at a coarser granularity than individual pages. For example each access frequency tracking indicator could correspond to a block of multiple pages and so the access frequency tracking indicator corresponding to a given page may be the access frequency tracking indicator which corresponds to the block of pages comprising the given page. Managing the access frequency tracking indicators on a region or block based basis instead of at the granularity of individual pages can reduce the size of the access frequency tracking structure and can still provide useful information about relative frequency of access to different blocks/regions of memory.

In one example, the access frequency tracking structure may comprise an access frequency tracking hardware structure comprising a plurality of entries each to store the access frequency tracking indicator for a corresponding page of the memory address space. Hence, the access frequency tracking indicators could be maintained in a hardware storage structure, separate from memory, which can be looked up (similar to a cache) based on the address of a memory access, to identify the corresponding access frequency tracking indicator.

A mechanism may be provided to allow software to read the access frequency tracking indicator corresponding to a given address from the access frequency tracking hardware structure.

Also, or instead of allowing direct software access to the access frequency tracking indicators in the access frequency tracking hardware structure, the access frequency tracking hardware structure could act as a cache of a memory-based backing data structure which provides access frequency tracking indicators corresponding to respective pages of the address space. The memory-based backing data structure may store tracking indicators for a larger number of pages than the access frequency tracking hardware structure. In response to a given memory access to a given page, the access frequency tracking circuitry may perform the chance-dependent test and, if the outcome is the first outcome, update the access frequency tracking indicator in the corresponding entry of the access frequency tracking hardware structure for the given page. If there is not already an entry corresponding to the given page then a new entry can be allocated into the access frequency tracking hardware structure. On a writeback event associated with a given access frequency tracking indicator, the value of that tracking indicator could be used to update the corresponding indicator in the backing data structure in memory. For example, the writeback event could be counter overflow of the given access frequency tracking indicator or the given access frequency tracking indicator reaching a given threshold. Also, the writeback event could be eviction of an entry from the access frequency tracking hardware structure (e.g. due to capacity conflict when a new entry is to be allocated for a page not previously having a corresponding entry in the access frequency tracking hardware structure), Hence, in an implementation where the access frequency tracking hardware structure acts as a cache of a backing data structure in memory, there may be no need for direct software access to the access frequency tracking hardware structure, as software may be able to access the underlying backing data structure in memory to read the access frequency tracking indicator associated with a particular page.

The access frequency tracking hardware structure could be a dedicated hardware storage structure provided specifically for storing the access frequency tracking indicators.

Alternatively, entries of the access frequency tracking hardware structure could also be used for purposes other than tracking access frequency. For example, the access frequency tracking hardware structure may be a translation lookaside buffer (TLB), and the plurality of entries may be translation lookaside buffer entries each to store the access frequency tracking information and address translation information associated with the corresponding page. This can be an efficient approach in terms of power and circuit area, since typically the TLB may already be provided for speeding up access translation and already offers a lookup mechanism for looking up information for a page to be accessed in memory, so by extending the TLB entries to also include the access frequency tracking indicator for a given page, this avoids the cost of providing a second set of cache lookup logic for looking up a dedicated structure.

In other examples, the access frequency tracking structure (which is updated in response to the chance-dependent test giving the first outcome for a particular memory access) may be a memory-based data structure stored in the memory system. In this case, there may be no specific hardware storage for the access frequency tracking indicators (other than the general memory system which is already provided for general data storage and any data caches which cache general data from the memory system). This approach reduces the circuit area cost of implementing the access frequency tracking. As the chance-dependent test means that the access frequency tracking indicator for a given page is only updated on a fraction of accesses, the performance cost of additional accesses to memory may be limited compared to alternative approaches which do not use the statistical approach using the chance-dependent test. In the implementation where the access frequency tracking structure itself is a memory-based structure, this differs from the memory-based backing data structure mentioned above which is the backing structure for a hardware cache of access frequency tracking indicators, since in the case where the memory-based structure acts as backing data structure for the hardware cache, the memory-based backing data structure is updated in response to evictions from the cache or other flush events triggering a cache writeback to memory, rather than updating the memory-based backing data structure each time the chance-dependent test provides the first outcome. In contrast, where the access frequency tracking structure is itself a data structure stored in memory, that structure may be updated for each time the chance-dependent test provides the first outcome.

Hence, when a memory-based structure is used as the access frequency tracking structure, the access frequency tracking structure may be allocated certain addresses within the memory space and updates to the access frequency tracking structure may be performed by the access frequency tracking circuitry, by controlling issuing of one or more memory access requests to request that the access frequency tracking indicator corresponding to the given page is incremented or updated in memory. All or part of the access frequency tracking structure may be cached within at least one cache of the memory system, so it may not always be necessary to update the location corresponding to the access frequency tracking structure in the backing store in main memory, if the memory access request for updating the access frequency tracking structure hits in a cache earlier in the memory hierarchy.

In one example, the memory-based access frequency tracking structure could be implemented as a linear data structure which comprises a number of entries having addresses in a contiguous block of memory address space, and the access frequency tracking circuitry may identify the entry of the linear data structure which provides the access frequency tracking indicator corresponding to the given page based on an offset determined based on the address of the given page. Such a linear data structure may be simpler to parse when software traverses the data structure to identify which pages have been accessed more frequently than others.

Alternatively the memory-based access frequency tracking structure could be implemented as a tree structure, where accessing the access frequency tracking indicator for a given page may depend on traversing multiple levels of a tree structure to follow pointers from a root node of the tree through various branches of the tree to identify the access frequency tracking indicator at a leaf node of the tree. In some cases the tree structure could be independent from any tree structure used to track page table entries for specifying address translation information for corresponding pages of the memory address space.

However, as in many cases the page table structure may already be available and there may be a certain number of bits available in page table entries which could be reused to provide the access frequency tracking indicator, then in some cases the memory-based access frequency tracking structure may comprise the page table structure itself, so that the page table entry corresponding to a given page comprises the access frequency tracking indicator corresponding that that page. This avoids the need to define a separate structure and can allow existing mechanisms for traversing the page table structure to be reused for access frequency tracking. By supporting a probabilistic approach to updating the access frequency tracking indicator depending on the chance-dependent test, then this allows a wider range of access frequency to be tracked using a page table entry even if there are only a relatively small number of bits spare for specifying the access frequency tracking indicator.

Regardless of whether the memory-based access frequency tracking structure is implemented as a linear data structure or as a tree structure, indexing of the access frequency tracking structure may be performed based on the address corresponding to the given page. This differs from a sequential log of events where a number of records are allocated sequentially to a log data store as various events occur, with the records ordered by the time the respective events occurred and each event record providing information about a particular event. By providing a structure which can be indexed based on the address of a given page this makes it more efficient for software to identify the access frequency tracking indicator corresponding to a particular page.

The access frequency tracking circuitry could be implemented at different locations within a data processing system. In some cases the access frequency tracking circuitry and the memory access circuitry may be provided within a processing element which also comprises processing circuitry to perform data processing in response to instructions defined according to an instruction set architecture (ISA). For example, the processing element may be a central processing unit (CPU) or graphics processing unit (GPU), which may be provided with the access frequency tracking circuitry.

In another example the apparatus may comprise an input/output memory management unit (IOMMU) which may perform memory management operations on behalf of a device having direct memory access to the memory system. The IOMMU could also be referred to as a "system memory management unit" (SMMU). The IOMMU may perform corresponding operations to those that would be performed by a memory management unit (MMU) within a processing element, but may do this on behalf of devices which have direct memory access to the memory system, where those devices may not themselves have processing circuitry capable of executing ISA-defined program instructions. The IOMMU may comprise the memory access circuitry and the access frequency tracking circuitry as discussed above so that the frequency of accesses of memory access requests made from such devices can also be tracked.

In some cases, a data processing system may comprise multiple sources of memory access requests (e.g. a plurality of processing elements, or at least one processing element and at least one IOMMU) each having the access frequency tracking circuitry. In that case, the respective access frequency tracking circuitry in the processing element and the IOMMU could be configured to update the same access frequency tracking structure (or could update different local access frequency tracking structures which are backed up to a shared access frequency tracking data structure stored in memory). Alternatively, the different sources of memory accesses could each update their own dedicated access frequency tracking structures, so that the frequency of accesses made by the devices are tracked separate from the frequency of accesses made by processing elements.

It will be appreciated that some systems may not have an IOMMU at all, or alternatively some systems even if they do have both the processing element and the IOMMU could only implement the access frequency tracking circuitry in one of the processing element and the IOMMU, so it is not essential for both to comprise the access frequency tracking circuitry.

Figure 1:
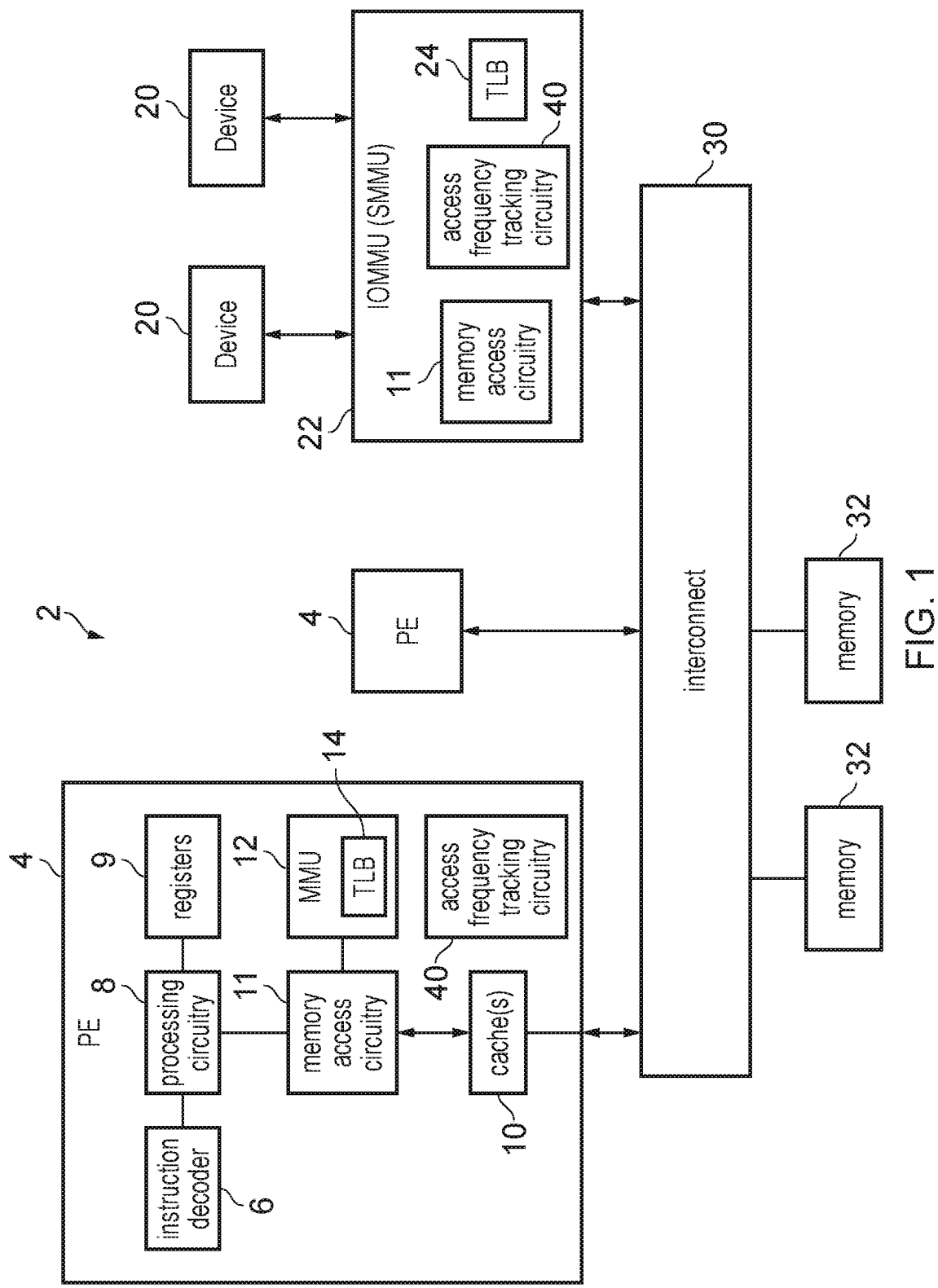

FIG. 1 schematically illustrates an example of a data processing system 2 having at least one processing element (PE) 4, e.g. a CPU (Central Processing Unit) or GPU (Graphics Processing Unit), which has an instruction decoder 6 for decoding program instructions and processing circuitry 8 which is controlled to perform processing operations in response to the instructions decoded by the instruction decoder 6. Registers 9 are provided to store data which can be used as operands by instructions executed by the processing circuitry 8. Results of operations performed by the processing circuitry 8 may be written back to the registers 9. The PE 4 has at least one cache 10 for caching data from memory for faster access by the CPU, memory access circuitry 11 for issuing memory access requests for accessing the memory system (including cache(s) 10 and main memory 32) in response to memory access instructions executed by the processing circuitry 8, and a memory management unit (MMU) 12 which functions as address translation circuitry for translating virtual addresses specified by instructions executed by the PE 4 into physical addresses identifying locations within the memory system. The MMU 12 may have at least one translation lookaside buffer (TLB) 14 for storing translation entries which depend on page table data from page table structures stored in the memory system. The page table structures define the address mappings between virtual and physical addresses and may also define memory access permissions which may define whether certain software processes executing on the PE 4 are allowed to access certain addresses. The MMU 12 may support 2-stage address translation where the mapping of a virtual address to a physical address depends on both stage 1 address translation data which maps the virtual address (VA) to an intermediate physical address (IPA) and stage 2 translation data which maps the IPA to a physical address (PA). The stage 1 address translation data may be set by an operating system or virtual machine. The stage 2 translation data may be set by a hypervisor.

The PE 4 is an example of a requester device which is capable of executing program instructions. FIG. 1 shows an example of a system with two such PEs 4, but clearly the number of PEs could vary. Some systems may only have a single PE, while others may have more than two. For conciseness, the internal components of the second PE 4 are not shown in FIG. 1, but it will be appreciated that the second PE 4 may also include the instruction decoder 6, processing circuitry 8, registers 9, cache(s) 10, memory access circuitry 11 and MMU 12. In some cases, the PEs 4 may be symmetric and may have the same design. It is also possible to include heterogeneous or asymmetric PEs 4 which have different components or for which the components such as the processing circuitry 8, cache(s) 10 etc. may have different micro-architectural implementations.

In addition to the PEs 4, the system may also include requester devices 20 which may not have an internal MMU, and so for accessing memory and providing address translation functionality, such devices may communicate with the rest of the system via an input/output memory management unit (IOMMU), also known as a system memory management unit (SMMU), 22. The IOMMU 22 includes address translation circuitry which controls address translation and memory permissions based on translation data defined in page table structures in memory. The IOMMU 22 may have one or more TLBs 24 which have a similar functionality to the TLBs 14 within the MMU 12 of the CPU 4. For example, a device 20 could include a display controller for controlling display of image frames on display, a network controller for controlling input or output of data via a network, a hardware accelerator for performing certain dedicated processing functions in a more efficient manner than can be achieved using software executing on a generic processor such as the CPU 4, and so on. The devices 20 have direct memory access to the memory 32, which means that they can issue access requests to request access to stored data directly, without needing to be explicitly programmed to do so by the PEs 4.

The requester devices 4, 20 communicate with each other via an interconnect 30 which is responsible for routing transactions between the requester devices and memory 32 and between respective requester devices. Interconnect 30 may also be responsible for managing coherency between data cached in respective caches 10 of the system. It will be appreciated that FIG. 1 is a simplified diagram and the system 2 may have many other components not shown in FIG. 1 for conciseness.

As shown in FIG. 1, the processing element 4 and/or the IOMMU 22 may have access frequency tracking circuitry 40 for monitoring memory access requests made by the memory access circuitry 11, and for updating an access frequency tracking structure which provides indications of relative frequency of access for respective pages of the memory address space.

One approach for page access frequency tracking is for a PE 4 or IOMMU 22 to maintain accessed/dirty flags on a per-page basis, setting a flag in a translation descriptor (page table entry) when a page is accessed or modified. The access flag can be used by operating systems to classify pages into "cold" or "hot" pages. For example, if a victim page needs to be selected for swap-out when memory is tight, the operating system (OS) may prefer to target a page that won't be used again soon, and can predict whether the page will be used again based on whether it has been used recently.

This area is getting particular attention because of new non-uniformities in the memory system. Some parts of memory may be faster (higher bandwidth or lower latency) than others due to memory technology or physical proximity to the processing element or accessing agent. NUMA (non-uniform memory access) migration or multi-tiered page migration is being actively researched: for example, monitoring access patterns so that frequently-accessed data can be copied to a page that is closer to an accessing agent. Detecting that pages are frequently-accessed is one portion of this (with the copy/move of data being a separate problem).

Two possible approaches to detect frequently-accessed pages are as follows: page protection and the per-page access flag. As a general procedure, a periodic software process samples whether pages have been accessed and amalgamates this information into a longer-term data structure (stored in memory and maintained by the software) which keeps count across several sampling periods. This data then gives a view of which pages have been accessed more frequently than others (for example, a software-maintained histogram/per-page counter shows the relative number of samples between pages). This software procedure can be used with the page access flag or page protection as follows:

Option 1—The access flag is cleared in all pages at the start of a sampling period. After a delay (periodic time, or at some interesting OS event) the page table is traversed and the access flag of each page observed. If the access flag is set, the software procedure updates the longer-term data structure (e.g. increments a counter corresponding to the page address) and clears the access flag. The process is repeated.

Option 2—Or, the permission attributes of pages are modified to make the pages inaccessible at the start of a sampling period. If that page is accessed, a page fault occurs; the page fault handler updates the longer-term data structure and makes the page accessible for a period of time. (This event may be used to trigger a different page to be protected/sampled.)

Option 1 has the disadvantage of being non-directed and requiring software to traverse the entire page table on the off chance of discovering a page has been marked accessed; even though this task can be performed on a different CPU to an application, it takes a very long time to traverse a large page table and wastes background CPU time.

Option 2 has the disadvantage of being high-overhead for the application if it is frequently interrupted by page faults, or of being inaccurate if it is interrupted rarely—this method wastes CPU time "inline".

Hence, capturing the access state of pages is (depending on mechanism) costly, but also unless it is sampled at an unfeasibly high rate, the access state is a poor proxy for ongoing page access frequency. It becomes difficult to differentiate a page that is accessed "sometimes" from a page that is very hot, without maintaining per-page counters, which are also spatially costly. As an example, a page accessed 100-1000 times/second might be considered "cold", compared to a page accessed 1 million times/second.

In the examples described below, an access frequency tracking structure is provided (e.g. in memory or in a hardware storage structure) having entries corresponding to respective pages in an address space. The tracking structure can approximate having a large per-page counter that is updated upon every load or store, but without the astronomical cost of that approach. An observation is that for "page is hot" decisions, a threshold may be employed such that if a page is accessed more frequently than the threshold it is considered hot (but after that point the relative values aren't as interesting). With the technique discussed in this application, the access frequency tracking circuitry 40 gives execution of a load or store instruction a configurable probability of updating a bit or access frequency tracking counter in the tracking structure corresponding to the accessed address of that load/store. The probability is configured in a register and can be adjusted depending on the page migration algorithm in use. In one specific example, this can be implemented by incrementing a test evaluating counter upon execution of each load/store instruction. When the test evaluating counter has reached the configured value then execution of a load/store instruction both causes an update to the tracking structure and a reset of the test evaluating counter value. Other examples of implementing a chance-dependent test having a configurable probability are also described. This technique can also be applied to an IO (input/output) access whereby an IOMMU 22 updates the secondary data structure in response to read/write transactions from a client device 20.

When this feature is implemented in the hardware circuitry of the apparatus, this allows the software profiling the address space for 'hot' pages to set the probability register (to define a probability 1/P) appropriate to what it considers a "hot" page. In one particular example, the information in the secondary data structure can mean:

1—The corresponding page is likely to have been accessed>P/2 times
0—The corresponding page is not likely to have been accessed>P/2 times Variations on this idea include:
    A probabilistic update could be made to a field in the corresponding PTE instead of a secondary data structure.
    Using a different probability value for loads instead of stores.
    Updating a different secondary structure based on loads vs stores.
    Having a different probability value for different areas of the address space.
    Instead of one bit per page (meaning "page is hot") in a data structure, update a small (e.g. 2-3 bits) saturating counter. This allows "page is hot" and "page is really hot" to be differentiated, which permits migration algorithms to prioritise among them. This also provides a degree of filtering out the noise of false positives.

False positives will arise (for example, a load accessing an address that has never been accessed before happens to trigger an update, having "rolled the dice" correctly) and the software algorithm may filter the updates over a period of time.

A variant which can provide improved correlation between actual frequency of access and the recorded tracking information (with reduced chance of false positive) can be to:

Extend a TLB entry with a counter which is incremented on a TLB lookup that hit that entry, if a dice-roll probability test is passed for that lookup.
    On overflow, a structure bit is updated corresponding to the address of the TLB entry. (This may be implemented similarly to LRU counters in caches.)

Figure 2:
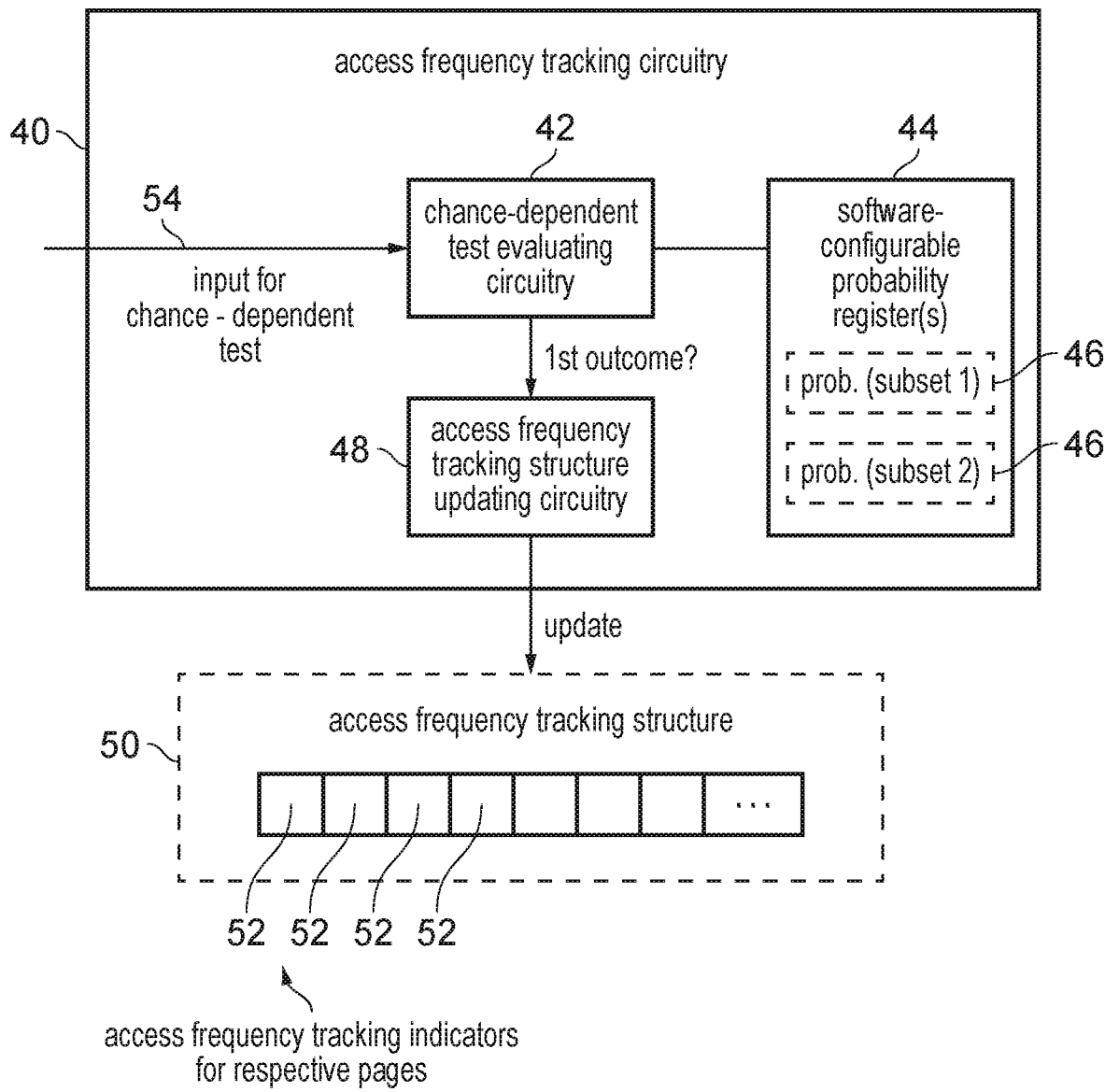
FIG. 2 illustrates an example of access frequency tracking circuitry.

FIG. 2 schematically illustrates an example of the access frequency tracking circuitry 40, which could be included either within a processing element 4 or within an IOMMU 22. The access frequency tracking circuitry 40 has chance-dependent test evaluating circuitry 42 for determining whether a chance-dependent test performed for a given memory access request has a first outcome or another outcome other than the first outcome. A number of different examples of the chance-dependent test are described below with respect to FIGS. 4-8. The access frequency tracking circuitry 40 has at least one software-configurable probability register 44 which defines one or more configurable values which may control the probability with which the chance-dependent test evaluating circuitry provides the first outcome. For example, the probability registers may store values which configure the number of bits in a counter or other input value 54 used to evaluate whether the chance-dependent test provides the first outcome.

As shown in FIG. 2, in some examples the software-configurable probability registers 44 may include two or more distinct probability configuring values 46 corresponding to different subsets of memory access requests, so that the probability of the chance-dependent test providing the first outcome can be set independently for different subsets of memory access requests. For example the different subsets could comprise loads and stores respectively, or could comprise requests issued from different operating states or execution modes of the processing element 4, or could comprise requests targeting different regions of the memory address space, or could correspond to different combinations of two or more of these properties. The ability to update the probability controlling values 46 in the software-configurable probability registers 44 may be restricted to instructions executed by the processing element which have a certain level of privilege, such as instructions executed at a particular exception level or higher. Instructions executed at lower exception levels or which are unprivileged may not be allowed to change the value in the software-configurable probability registers 44. In some cases the software-configurable probability registers could be implemented as control registers within the instruction set architecture supported by the instruction decoder 6 and processing circuitry 8, while in other examples the software-configurable probability registers 44 could be memory mapped registers which are accessed by the processing circuitry 8 executing load/store instructions which specify a target memory address mapped to the software-configurable probability registers 44.

The access frequency tracking circuitry 40 also has access frequency tracking structure updating circuitry 48 for triggering an update to an access frequency tracking structure 50 when the chance-dependent test evaluating circuitry 42 determines that the test provides the first outcome. When the chance-dependent test provides an outcome other than the first outcome then no update of the access frequency tracking structure 50 is necessary. In some cases the access frequency tracking structure may be stored within a dedicated hardware data structure such as an access frequency tracking hardware structure or a set of registers dedicated to storing the access frequency tracking structure. For example, the access frequency tracking hardware structure could be the TLB 14.

However, in other examples the access frequency tracking structure which is updated when the chance-dependent test gives the first outcome can be implemented as a data structure within memory 32, some parts of which may be cached within general data caches 10. The memory-based structure can be updated by the access frequency tracking structure updating circuitry 48 issuing one or more memory access requests specifying, as their target addresses, addresses corresponding to the locations within the access frequency tracking structure 50. This can reduce the circuit area cost within the PE 4 or IOMMU 22 as there is no need for additional storage logic within the PE 4 or IOMMU 22 for holding the access frequency tracking indicators.

The access frequency tracking structure may include a number of access frequency tracking indicators 52 which each correspond to a block of one or more pages of the address space and provides an indication of the relative frequency of access to that block of pages. In some cases the access frequency tracking indicators 52 could be provided for every page, but this is not essential and some pages need not have corresponding indicators in their tracking structure (e.g. it may not be necessary to include indicators corresponding to currently unmapped pages which do not have a virtual to physical address mapping defined). Also, in some examples, each access frequency tracking indicator could correspond to a single page so that respective pages have different tracking indicators, but in other cases the granularity of tracking may be less fine-grained and a single indicator 52 could be shared between a block of adjacent pages. The relevant indicator 52 which corresponds to a particular page can be identified based on the address of that page, e.g. the address may be used to derive an offset relative to a base address of the structure 50, or various sets of index bits of the page address may be used to control traversal through a tree structure. When address translation is used, it may be the virtual address of the page that is used to index into the data structure 50, so that software can parse the structure 50 based on virtual addresses rather than needing to obtain corresponding physical addresses.

While the access frequency tracking structure updating circuitry 48 may comprise hardware circuit logic to automatically initiate any required updates of the access frequency tracking structure without needing explicit software store instructions to control those updates to be performed, the access frequency tracking structure 50 may also be accessible by software issuing load instructions specifying addresses within the data structure, which can be useful when an operating system or other software subsequently wishes to parse the access frequency tracking structure 50 to identify the pages which may have been accessed frequently.

Figure 3:
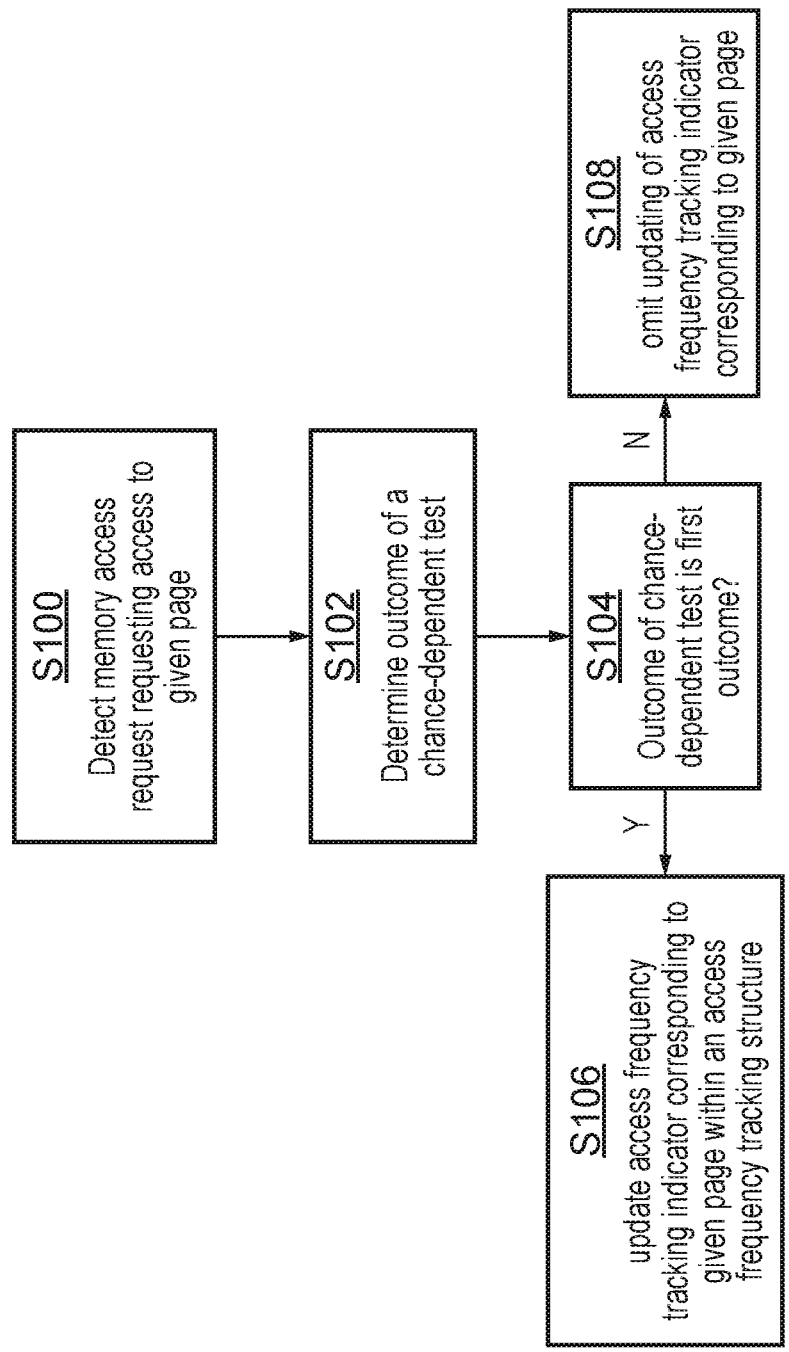
FIG. 3 is a flow diagram illustrating a method of tracking frequency of access to a given page of a memory address space.

FIG. 3 is a flow diagram showing a method of monitoring relative frequency of access to respective pages of an address space. At step S100 the access frequency tracking circuitry 40 detects that the memory access circuitry 11 has received or is processing a memory access request requesting access to a given page. In response to the memory access request being received or processed, at step S102 the chance-dependent test evaluating circuitry 42 determines the outcome of a chance-dependent test evaluated for that memory access request. The chance-dependent test may be any test which generates an uncertain outcome which may depend at least partly on chance, so that the outcome of the chance-dependent test cannot be derived deterministically based on the properties of the memory access request alone or on any control parameters used to govern whether the memory access request is allowed or which control the location within the memory system to be accessed in response to the memory access request. For example, the chance-dependent test could depend on random or pseudo-random numbers, on arbitrarily sampled bits from pulse trains or other internal state sampled within the system that is uncorrelated with the memory access request itself, or on a counter provided for counting the number of memory access requests which may have a certain 1 in N probability of having a particular value at the time when a memory access request is received. Regardless of the way in which the chance-dependent test is performed, the test may be such that even if exactly the same memory access request having the same properties is issued a number of times, the chance-dependent test may have different outcomes for those repeated instances of the same memory access request. This means that the access frequency tracking structure 50 will not be updated in response to every occurrence of a memory access to a given page, but rather sometimes the chance-dependent test may succeed and so the access frequency tracking structure is updated and at other times the chance-dependent test fails and no update is performed, with the outcome for an individual memory access request being essentially arbitrary but with a configurable probability as controlled by the software-configurable probability registers 44.

Hence, at step S104 the chance-dependent test evaluating circuitry 42 or the access frequency tracking structure updating circuitry 48 determines whether the outcome of the chance-dependent test is the first outcome, and if so then at step S106 the access frequency tracking structure updating circuitry 48 updates the access frequency tracking indicator 52 which corresponds to the given page accessed by the memory access request within the access frequency tracking structure 50. If the outcome of the chance-dependent test was not the first outcome then at step S108 this update of the access frequency tracking indicator 52 corresponding to the given page is omitted.

Hence, by controlling whether the access frequency tracking structure 50 is updated for a given memory access request based on a chance-dependent test 42 which has a probability of less than 1 of providing the first outcome, so that the access frequency tracking structure 50 is not updated every time the corresponding page is accessed, then this means that even if the purpose of the access frequency tracking structure 50 is to count memory accesses over a relatively large range, the size of any counters needed for the access frequency tracking indicators 52 does not need to scale with the same range as the number of accesses aimed to be tracked, since a lower chance of incrementing means a smaller counter can be employed while measuring a large absolute range, hence saving many bits of state and therefore reducing the area, power and performance cost of implementing the access frequency tracking structure.

As shown in FIG. 2 the chance-dependent test may depend on certain input information 54 provided to the chance-dependent test evaluating circuitry. This information may have a range of forms depending on the nature of the chance-dependent test implemented. In general the chance-dependent test may use input information which may vary substantially randomly in a way which is not particularly correlated with the nature of the memory access request itself. From the point of view of software, whether a particular memory access request passes the chance-dependent test can be seen as a dice-roll event so that the outcome for a particular memory access request is uncertain but in general the more frequently accessed a given page is, the more rolls of the dice that page gets and so the more likely it is that the page has its access frequency tracking indicator 52 set to distinguish it from other less frequently accessed pages. Nevertheless, there could be occasional false positives where a page accessed for the first time happens to win on the dice roll and have the chance-dependent test providing the first outcome even though it had never been accessed before, while a more frequently accessed page keeps losing on the dice roll and never gets its access frequency tracking indicator updated. Nevertheless, on average the more frequently accessed pages are more likely to be identified using this mechanism and so this can still be beneficial for performance by allowing some placement decisions for placing certain data within the memory system to be optimised to favour more frequently accessed pages.

Figure 4:
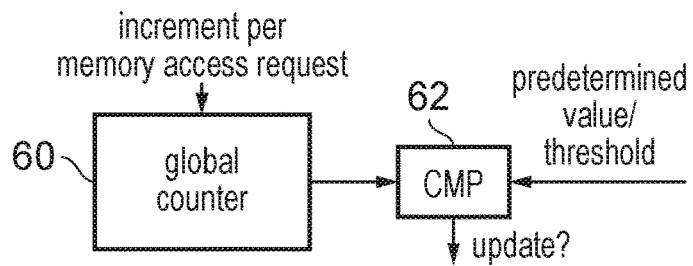
FIGS. 4 to 8 illustrate a number of examples of implementing a chance-dependent test.

FIGS. 4-8 illustrate a number of different examples for implementing the chance-dependent test. As shown in FIG. 4, in one example a global counter 60 may be maintained by the access frequency tracking circuitry 40, with the global counter being shared among all memory access requests. When a memory access request is processed, the global counter 60 is incremented or otherwise advanced to its next state. It will be appreciated that although one implementation of the counter may be as a binary value which is incremented by adding or subtracting 1 in response to each memory access request, other approaches could represent the counter as a shift register which transitions between a certain sequence of states so does not necessarily need to be incremented or decremented (e.g. the shift register could be shifted right or left by one bit position). The current value of the global counter 60 is compared by a comparator 62 against a predetermined value or threshold and depending on the comparison a signal is issued to the access frequency tracking structure updating circuitry 48 to control whether the corresponding access frequency tracking indicator 52 is set or updated for the corresponding page accessed by the current memory access request. Hence, with this approach whether the chance-dependent test leads to the first outcome is based on whether the global counter has reached the threshold or matches the predetermined value, and this may effectively be random for an individual memory access request since which particular memory access request happens to be processed at the time when the counter elapses or reaches its threshold may be effectively arbitrary and depend on the timing of processing that memory access request relative to other memory access requests, which may depend on micro-architectural implementation details such as whether out of order execution is supported and the size of any operation queues within which operations can be reordered, as well as events that may vary from one execution run to another, such as the timing of particular interrupts being triggered, and so the counter value can be seen as uncorrelated to the properties of a given memory access request so that whether the counter satisfies the condition required for determining the first outcome can be seen as a matter of chance. After the counter 60 has been determined to reach the state in which the predetermined condition is satisfied, it is then reset to its initial state to resume another period of counting memory access requests.

Figure 5:
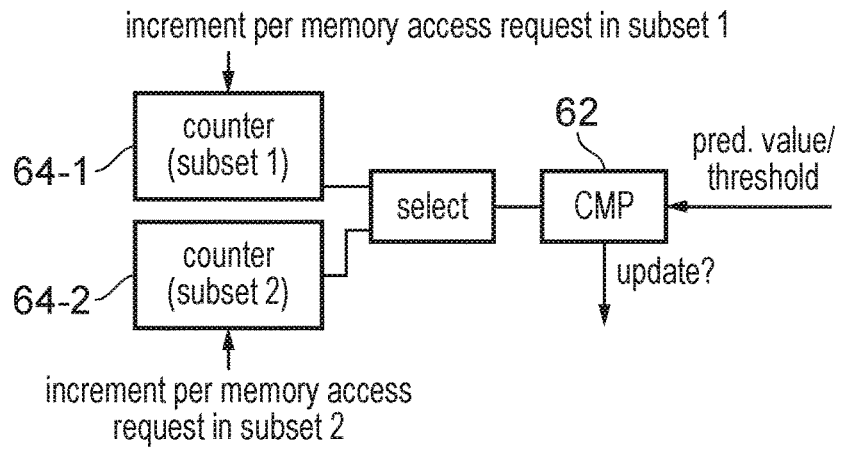

FIG. 5 shows a similar approach to FIG. 4, except that the global counter 60 is replaced with a number of local counters 64 which each correspond to certain subset of memory access requests. When a memory access request in a first subset is encountered then a first local counter 64-1 is incremented or advanced in state and similarly when a memory access request in a second subset is encountered then a second local counter 64-2 is incremented or advanced in state. The local counter to use for evaluating the chance-dependent test for the current memory access request is selected based on which subset that memory access request belongs to, and a comparator 62 compares the state of the selected counter 64 with the predetermined value or threshold similar to FIG. 4. When the counter reaches the predetermined value or threshold, then the access frequency tracking structure updating circuitry 48 triggers an update of the relevant tracking indicator 52 within the access frequency tracking structure 50. Also the relevant counter 64 that was selected may be reset to its initial state to resume counting another period. Again, there may be different ways of classifying memory access requests into different subsets, for example subsets may be differentiated by the type of memory access request (e.g. loads vs. stores), the particular region of the address space targeted by the memory access request, and/or the execution mode or state or privilege level associated with the memory access request (or any combination of these factors).

In examples which use a counter such as in FIGS. 4 and 5, the software configurable probability register 44 may store a value which controls how many transitions are required to advance the counters 60, 64 between the initial state (to which the counter is reset after an update event has just occurred) and the state at which the next update event is detected (when the counter is deemed to meet the predetermined threshold or condition). For example the value in the software-configurable probability registers 44 could cause the chance-dependent test evaluating circuitry 42 to adjust either the value reset to the counter 60, 64 after an update event has just occurred, or to adjust the value or threshold to which the counter is compared, which can provide similar results.

Figure 6:
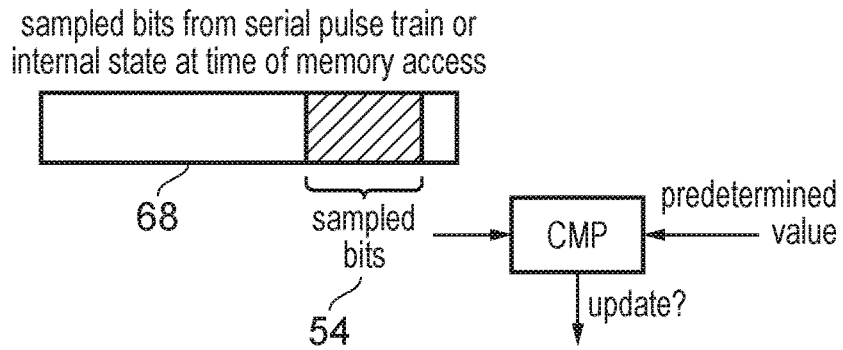

FIG. 6 shows another example of implementing the chance-dependent test. In this example, the input 54 for the chance dependent test may comprise a number of bits sampled from within a serial pulse train or item of internal state 68 sampled at the time of the relevant memory access request for which the chance-dependent test is being evaluated. A serial pulse train may be a sequence of bits derived from values sampled from a particular signal or group of signals at respective instances over time. E.g. the values of a certain signal may be digitally sampled over a number of clock cycles, and if the sampled values provide a certain pattern of 1s and 0s matching a predetermined value, then the update condition may be considered satisfied (the first outcome occurs in the chance-dependent test), while other patterns of 1s and 0s may correspond to the first outcome not occurring. Alternatively, items of internal state which have other functional purposes, such as event counters for counting events such as clock cycle elapse, cache misses in the caches 10, number of address faults or other errors etc. may be used to provide the internal state 68 from which a certain number of bits 54 may be extracted and compared against the predetermined value to determine whether the first outcome has arisen. The selection of which particular items of internal state are sampled, or which particular analogue or digital signals are be sampled as a serial pulse train, can depend on the particular processor implementation. In some cases multiple items of internal state could be combined (e.g. based on an exclusive or, XOR, operation) to provide a pulse train or data value 68 which may have the sampled bits 54 with less bias towards a particular set of values. Hence, in the example of FIG. 6 there is no need to provide a dedicated counter 60, 64 for tracking memory accesses, but instead some items of internal state or existing analogue or digital signals within the processing system 2 can be used or combined with other items to provide a chance-dependent test.

Figure 7:
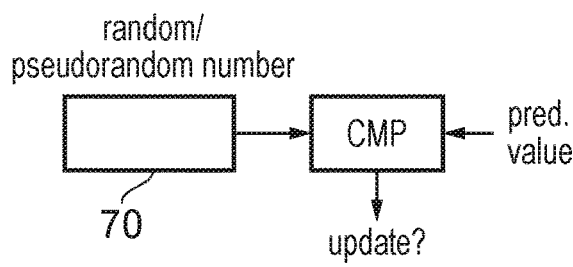

FIG. 7 shows another example where a random or pseudorandom number 70 is obtained and compared with a predetermined value and it is determined whether to update the access frequency tracking structure 50 depending on whether the random or pseudorandom number matches the predetermined value. This could exploit the fact that the processing system 2 may already have a random number generator or pseudorandom number generator for other purposes such as encryption, and so the source of randomness already available could be used to provide a random or pseudorandom number with a certain number of bits, so that an N-bit random or pseudorandom number may provide a 1 in N chance of having a particular value representing the first outcome and provides an outcome other than the first outcome when it does not match the predetermined value. The random or pseudorandom number can be regenerated for each memory access request for which the chance-dependent test is evaluated.

In both the examples of FIG. 6 and FIG. 7, the software configurable probability registers 44 may control the number of bits within the sample compared between the predetermined value in FIG. 6 or within the random/pseudorandom number 70 compared with the predetermined value in FIG. 7, to adjust the probability with which the access frequency tracking indicator 52 for the currently accessed page is updated.

Figure 8:
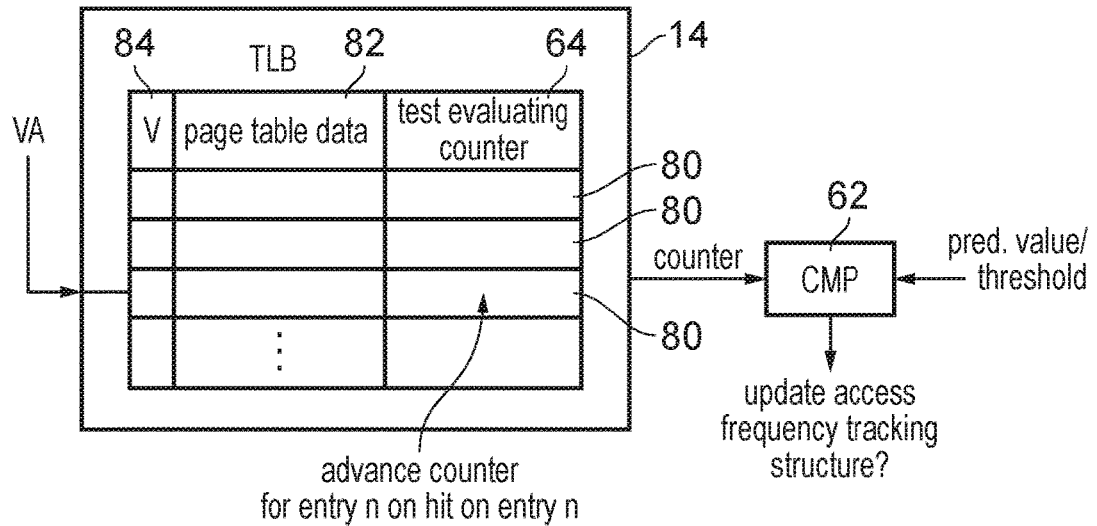

FIG. 8 shows another approach for implementing the chance-dependent test, which as in FIGS. 4 and 5 uses local counters 64 which act as the test evaluating counters for determining whether the chance-dependent test provides the first outcome for a given memory access request. However, in the example of FIG. 8 the TLB 14 has each TLB entry 80 extended so that, in addition to a valid bit 84 indicating TLB entry validity and any page table data 82 cached within the relevant TLB entry associated with a given page of the address space, the TLB entry also stores a test evaluating counter 64 which acts as the local counter corresponding to the memory access requests which target that particular page. Hence, with this approach each page for which page table data 82 is cached within a valid TLB entry 80 has a corresponding local counter 64 maintained for it by the MMU 12, so that when a given memory access request is issued, if the access request hits in the TLB 14 then its page table data 82 is read out and used to control address translation or evaluation of access permissions, and the counter 64 is read out and compared by the comparator 62 against the predetermined value or threshold to determine whether to update the access frequency tracking structure 50. Also, if there was a hit in the TLB then the test evaluating counter 64 in the corresponding TLB entry 80 is updated (e.g. incremented) to advance to the next state within its sequence of transitions. By maintaining different test evaluating counters 64 for different pages within the TLB 14, this can increase the likelihood that the access frequency tracking indicators 52 within the access frequency tracking structure 50 are more closely correlated with the actual relative frequencies of access for the corresponding page, reducing the probability that a less frequently accessed page is incorrectly identified as more frequently accessed and a more frequently accessed page due to the influence of chance on the respective chance-dependent tests carried out when those pages were accessed.

Figure 9:
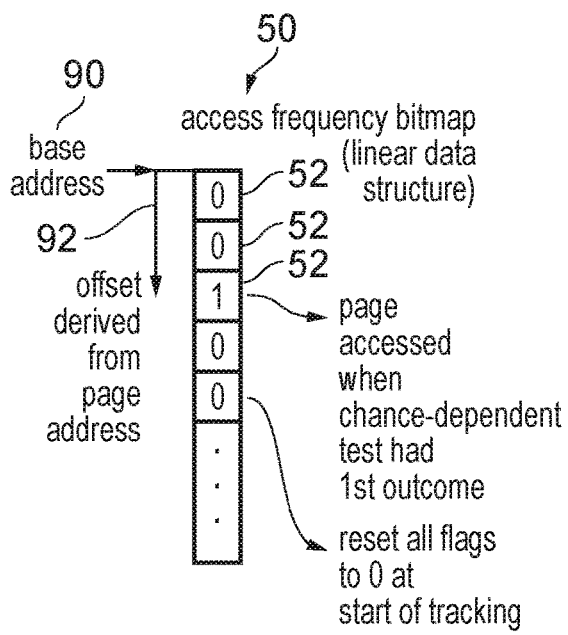
FIGS. 9 to 11 illustrate a number of examples of implementing an access frequency tracking structure.
Figure 10:
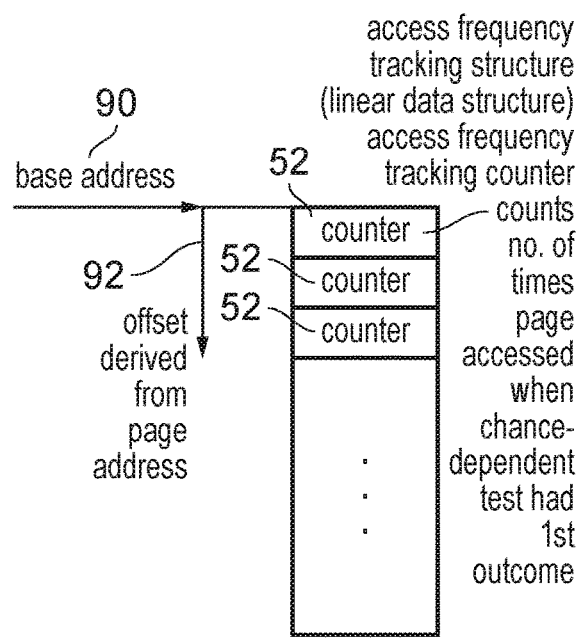
Figure 11:
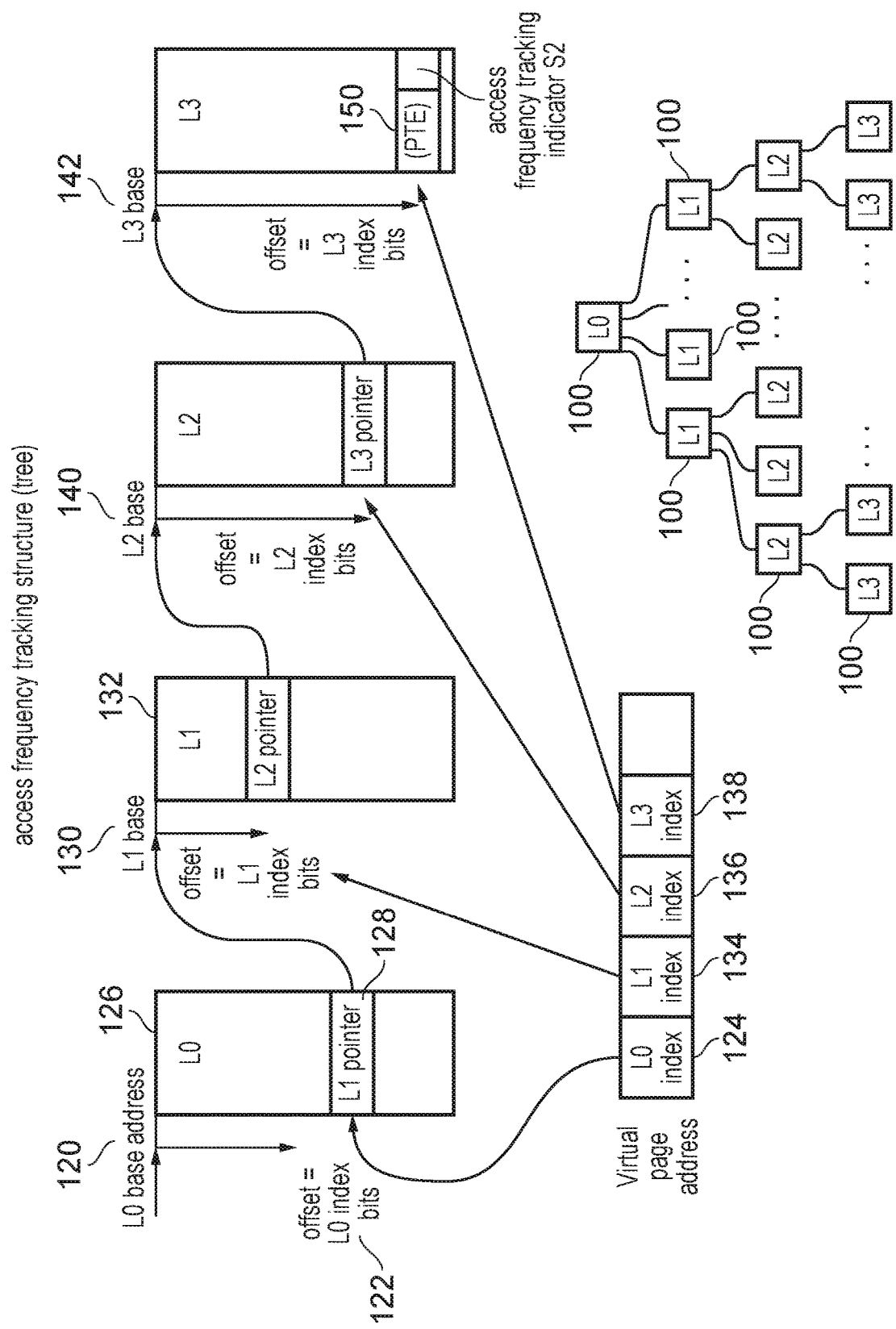

FIGS. 9-11 illustrate different ways of implementing a memory-based access frequency tracking structure 50. These techniques could also be used for the memory-based backing structure to which access frequency tracking indicators from a hardware caching structure such as the TLB are written back or flushed.

In the example of FIG. 9 the structure is implemented as an access frequency bitmap which provides a linear data structure stored as a block of memory addresses starting from a base address 90, where each access frequency tracking indicator 52 is a single bit flag which has a first value (0 in this example) to which all the flags are reset at the start of a period of tracking access frequency and is set to a second value (1 in this example) when the chance-dependent test has the first outcome for a particular memory access request targeting the relevant page corresponding to that tracking indicator 52. Hence, the indicators 52 which have the second value represent the pages that were accessed at least once when the chance-dependent test had the first outcome. A flag having the second value can be seen as indicating that the probability is greater than half of the page having been accessed at least P times where 1 in P is the probability of the chance-dependent test having the first outcome. The indexing into the access frequency bit map 50 may be performed based on the base address 90 and an offset 92 which may be derived from the address of the corresponding page. As this is a linear data structure all the access frequency tracking indicators 52 may be stored within a contiguous block of virtual address space (which may or may not be contiguous in physical address space depending on the address mapping used).

FIG. 10 shows a second example in which again the access frequency tracking structure is a linear data structure stored at addresses starting from a base address and indexed based on an offset 92 derived from the (virtual) page address of the page corresponding to the particular tracking indicator 52. However in this example each tracking indicator is a multi-bit access frequency tracking counter which counts the number of times the corresponding page was accessed when the chance-dependent test provided the first outcome. Note that these counters are different to the test evaluating counters 60, 64 described with respect to FIGS. 4, 5 and 8 which are for evaluating whether the chance-dependent test is satisfied for an individual memory access request but do not provide an indication of the relative frequency of access of a particular page. By using the chance-dependent update method described above, the counters 52 can be much smaller than would be needed if an access frequency tracking structure was updated for every memory access request while still simulating counting over a larger range. In both examples of FIGS. 9 and 10, some implementations may provide an access frequency tracking indicator 52 for respective pages within at least a portion of the address space, so that the granularity of setting the tracking indicators is on a page by page basis. Other approaches may share a tracking indicator 52 between a block of two or more adjacent pages.

FIG. 11 shows another approach to maintaining the memory-based access frequency tracking structure or the backing structure in memory for backing up access frequency tracking indicators from a hardware caching structure, in which a tree structure is used instead of the linear data structure shown in FIGS. 9 and 10. While it would be possible to maintain the tree structure separate from page tables used by the MMU 12 or IOMMU 22 to provide address translation data, in practice the address translation data may be defined in a set of page tables managed as a tree structure and may have some spare bits in each page table entry which could be used to provide the access frequency tracking indicator 52 (or to back up the access frequency tracking indicator 52 from the caching structure provided in hardware), and so in some cases the tree structure can be the page table structure itself. As shown in the bottom right of FIG. 11, a tree structure may comprise a number of tree nodes 100 where nodes at a higher level of the tree contain a number of pointers to respective nodes at lower levels of the tree, with a portion of bits from the address used to query the tree structure being used to select which of the alternative pointers to follow to obtain the location of the node at the next level of the tree, and different portions of the query address being used to select between these pointers at different levels of the tree. Eventually the final leaf entry of the tree is reached (e.g. at level 3 in this example, although it is also possible for tree nodes at earlier levels of the tree to be encoded to indicate that they terminate the tree transversal and themselves provide the relevant information sort for the query address). The leaf entry provides the data sought for the query address—e.g. a page table entry for page tables, and/or the access frequency tracking indicator 52 for the access frequency tracking data structure 50.

For example, for obtaining address translation data corresponding to a particular virtual page address, the MMU 12 or IOMMU 22 may use a level 0 (L0) base address 120 and an offset 122 derived from L0 index bits 124 of the virtual page address to select an entry of a level 0 page table 126 which provides a pointer 128 to the base address 130 of a level 1 (L1) page table 132 corresponding to the virtual page address. Different entries of the level 0 page table 126 may provide different pointers allowing the tree to branch out to different level 1 nodes at the next level of the tree after level 0. Similarly, at each subsequent level of the tree a further portion of index bits 134, 136, 138 is used to provide an offset relative to the base addresses 130, 140, 142 of the level 1, 2 and 3 page tables respectively. At branch nodes of the tree (nodes other than the leaf node which provides the actual page table entry itself), the selected entry provides a pointer to the next level. Eventually a leaf entry is found (whether at level 3 or at an earlier level if the tree traversal is terminated early) which provides the page table entry 150 of interest (e.g. encoding address translation mappings and/or access permissions for the corresponding page). This page table entry can be extended to provide the access frequency tracking indicator 52, which could be a single bit flag or a multi-bit counter as in the examples of FIGS. 9 and 10. Hence, in this example the access frequency tracking circuitry 40 may reuse mechanisms provided in the MMU 12 or SMMU 22 for traversing page tables to determine the address at which the relevant access frequency tracking indicator 52 should be updated when the chance-dependent test for a given memory access provides the first outcome. Hence, multiple memory accesses may be needed to locate the access frequency tracking indicator 52 to be updated. In other examples, a tree structure may be used which may be independent of the page tables and in that case an independent tree traversal mechanism may be implemented within the access frequency tracking circuitry 40. It will be appreciated that the number of tree levels shown in FIG. 11 is just one example and does not need to be 4 levels.

FIG. 12 shows another example, in which an access frequency tracking hardware structure 158 is provided in the PE 4 or IOMMU 22, comprising a number of storage entries 159 which can be looked up based on the address of a given page for a given memory access to obtain the access frequency tracking indicator 52 for that given page. Although the access frequency tracking hardware structure 158 could be a dedicated hardware structure for access frequency tracking, in this example the access frequency caching hardware structure 158 is the TLB 14 and so each entry 159 also specifies page table data 82 for the corresponding page. Again, each entry may have a valid bit 84 to indicate whether an entry is valid.

The access frequency tracking indicator 52 may be an access frequency tracking counter which is incremented on an access to the corresponding page for which the chance-dependent test gave the first outcome.

Hence, in this example, when an access is requested to a target page, if the address hits in the hardware structure 158, and the chance-dependent test gives the first outcome, the access frequency tracking indicator 52 in the corresponding entry in the tracking structure 158 is incremented, and this increment is omitted if the chance-dependent test gives another outcome.

If the address misses in the tracking structure, a new entry can be allocated for the address of the target page and the access frequency tracking indicator 52 set to an initial value (e.g. 0 or 1). If the tracking structure 158 is the TLB itself 14 then a new entry can be allocated on a TLB miss regardless of whether the chance-dependent test gives the first outcome (since the new entry may be needed anyway to cache the page table data 82 for the target page in the TLB, regardless of whether the counter is also incremented—in that case the initial value for the newly allocated entry could be 0 if the chance-dependent test did not give the first outcome or 1 if the chance-dependent test did give the first outcome). If the tracking structure 158 is a dedicated structure other than the TLB 14, then the new entry may be allocated if the chance-dependent test gives the first outcome on a miss in the structure, but no allocation may be needed if the chance-dependent test gives another outcome.

In the example of FIG. 12, the chance-dependent test is implemented using a global test evaluating counter 60 as in the example of FIG. 4, but the example of FIG. 12 could also use any of the other techniques for implementing the chance-dependent test as shown in FIGS. 5 to 8 for example. If the example of FIG. 8 is used for the chance-dependent test, then each entry 159 of the tracking structure could include, in addition to the access frequency tracking indicator 52, a local test evaluating counter 64 for the corresponding page, so that both types of counter 64, 52 could be provided, although in practice, the options shown in FIGS. 4-7 may be less costly in terms of circuit area to avoid needing to provide two separate counters per TLB entry 80.

In some examples, there may be no underlying memory-based structure backing up the access frequency tracking indicators 52 from the hardware structure 158 (14), although there may be a mechanism for software to read the value of the access frequency tracking indicator 52 for a given page from the hardware structure 158, and software could then control writing of such a tracking indicator 52 to a memory location selected by the software. In this case, there may be no hardware-managed means of backing up access frequency tracking indicators 52 from the tracking structure 14. With this approach, if an entry 159 of the structure 158 is invalidated or evicted (e.g. due to capacity conflict), the corresponding access frequency tracking indicator 52 could simply be discarded. For example, if the TLB 14 acts as the access frequency tracking hardware structure 158, it could be assumed that pages which are accessed sufficiently infrequently that they do not have a resident TLB entry may not be of interest for tracking access frequency. For software, it may be enough to know the access frequency tracking information about the more frequently accessed pages which do have allocated TLB entries. Therefore, the added cost of hardware-managed writeback of access frequency tracking indicators to memory may not be justified.

However, optionally in some implementations hardware circuitry in the access frequency tracking circuitry 40 may manage writeback of access frequency tracking indicators to a backing data structure 180 in memory. The access frequency tracking circuitry 40 could have a register which software can configure with a base address of the backing data structure 180. In this case, as shown in the dotted lines in FIG. 12, when a writeback event occurs for an entry 159 for a given page from the tracking hardware structure 158, the access frequency tracking circuitry 40 may cause one or more memory access requests to be issued to update a corresponding access frequency tracking indicator 182 for the given page within the memory-based backing data structure 180. The writeback event could, for example, be any of: eviction or invalidation of the entry 159 for the given page; overflow of the access frequency tracking indicator 52 in that entry 159; occurrence of a periodic flush event for triggering a writeback of all or a subset of the access frequency tracking indicators 52 in the hardware structure 158, and/or execution of a "flush" instruction for requesting that the access frequency tracking indicators 52 are written back to memory for all entries 159 of the hardware structure 158 or only for entries 159 meeting a filter condition specified by the instruction (e.g. that the entries 159 correspond to a specified address or address range).

The writeback can be performed in different ways. In some examples, the access frequency tracking indicator 182 could be a single-bit flag, so that on a writeback event, if the previous value of flag 182 is 0, it is updated to 1, but if the flag 182 was already 1 before the writeback event, it remains at 1. In this case, the memory-based structure 182 indicates whether overflow of the access frequency tracking indicator 52 occurred for respective pages, to signify that the number of accesses to the corresponding page is likely to be relatively large (e.g. likely to be greater than P/2 if the probability of the chance-dependent test giving the first outcome is 1/P).

Alternatively, the tracking indicator 182 in the memory-based structure 180 could be a multi-bit counter. In this case, on a writeback of a given tracking indicator 52, the value of that counter could be written to the corresponding indicator 182 in memory. Alternatively, a writeback may comprise adding a value derived from the written back counter 52 to the previous value of the indicator 182 in memory to generate an updated value written to the location of the indicator 182. This can be useful to allow multiple sources of memory accesses to share the same backing structure 180 so that the indicator 182 tracks the total number of accesses to the page initiated by any of those sources. The increment added to the indicator value in memory 182 may not be the exact value of the counter. For example, the increment could be a scaled version of the value of counter 52, with the scaling factor being variable depending on the probability 1/P of the chance-dependent test providing the first outcome—e.g. the scaling factor may be P. This may allow multiple sources using chance-dependent tests with different values of the probability to maintain a shared indicator 182 in memory which tracks the estimated number of accesses. Also, in an implementation which uses variation of the probability 1/P with numbers of accesses as discussed below for FIG. 13, the value of the estimated number of accesses may scale non-linearly with the value of the access frequency tracking counter 52, so in this case each possible value of access frequency tracking counter 52 could be associated with a corresponding increment value which represents an estimated number of accesses represented by that value of the counter 52, so that on a counter writeback the appropriate increment value can be selected based on the current value of the counter 52 for adding to the corresponding indicator 182 in memory.

As shown in FIG. 13, in some implementations the probability of the first outcome occurring in the chance-dependent test may from time to time be reduced as the frequency of accesses to a given page increases. The reduction in probability could be achieved, for example, by increasing the reset value for resetting the test evaluating counter, increasing the threshold value to be compared against the test evaluating counter to determine whether the first outcome has occurred, or increasing the number of bits in the sampled portion of the test evaluating counter, internal state, pulse train or random/pseudorandom number used to evaluate whether the first outcome has occurred.

For example, in the approach shown in FIG. 12 where a TLB 14 or other access frequency tracking hardware structure 158 provides access frequency tracking indicators 52 for respective pages, the probability of the chance-dependent test providing the first outcome for a given page could depend on the access frequency tracking indicator 52 for the given page. For example, as shown in FIG. 13 when the current value of the access frequency tracking counter 52 for a given page x reaches a first threshold 160 then the probability may be reduced from a first value A to a second value B, and then if the access frequency tracking counter for that page continues to increment and reaches a second threshold 162 then the probability can be reduced again from the second value B to a third value C.

For example, in an implementation where a test evaluating counter 60 is compared with the access frequency tracking indicator to evaluate the chance-dependent test, one way of implementing the gradual reduction in probability of the test giving the first outcome, could be to vary the number of bits of counter 60 that are compared with a predetermined value (such as zero), with the number of bits of the counter used for the comparison increasing with increasing values of the access frequency tracking indicator 52. A specific example, say, could be where a 16-bit test evaluating counter 60 is provided, the number of bits used for the comparison could vary with the value of the access frequency tracking indicator 52 to give different probabilities as follows:

| Value of access frequency tracking indicator 52 | Number of bits compared from counter | Probability of chance-dependent test giving first outcome |
| --- | --- | --- |
| 0 | 8 least significant bits | 1/256 |
| 1 | 9 least significant bits | 1/512 |
| 2 | 10 least significant bits | 1/1024 |
| 3 | 11 least significant bits | 1/2056 |
| 4 | 12 least significant bits | 1/4098 |
| 5 | 13 least significant bits | 1/8192 |
| 6 | 14 least significant bits | 1/16384 |
| 7 | 15 least significant bits | 1/32768 |
| 8 or greater | All 16 bits | 1/65536 |

This is just one example, and it will be appreciated that other implementations may choose different thresholds at which to reduce the probability.

In general, by reducing the probability, a greater number of accesses to the given page will be required on average to cause further increments of the counter 52, so that the counter value may scale non-linearly with the actual number of accesses to the corresponding page. This can be useful to allow a counter of relatively few bits to track frequency of accesses over several orders of magnitude so that the threshold numbers of accesses at which it is more probable than not that the counter will have been incremented do not need to be evenly distributed. For example, by setting the probabilities A, B, C and the threshold points 160, 162 at which the probabilities are switch appropriately, software could configure the counters so that a first value of the counter indicates that relatively few accesses have been made, a second level of the counter may indicate that the number of accesses is likely to be at least 10 or 100 times the first number, while the next value of the counter may indicate that it is probable that there have been several orders of magnitude more accesses, even if the counter value itself is incremented linearly. Again, this helps to reduce the size of the counter needed to determine tracking information about a certain range of numbers of accesses.

Hence, the probability configuration registers 44 may also include configuration data which may select any of the following:

whether to perform the gradual reduction in probability with increasing count values of the access frequency tracking counter 52, or to maintain a constant probability regardless of the value of the access frequency tracking counter 52;

the threshold points 160, 162 which define the values of the counter 52 at which the probability should be reduced;

the probability levels A, B, C to be set for different ranges of counter value.

the number of transition points at which the probability should be switched (FIG. 13 shows two transitions at thresholds 160, 162, but software may be able to select a different number).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   memory access circuitry configured to process memory access requests requesting access to a memory system; and
   access frequency tracking circuitry responsive to a given memory access request requesting access to a given page of a memory address space, to:
   determine an outcome of a chance-dependent test, where the outcome of the chance-dependent test, when determined for the given memory access request, is dependent on chance;
   when the outcome of the chance-dependent test is a first outcome, update an access frequency tracking indicator corresponding to the given page within an access frequency tracking structure; and
   when the outcome of the chance-dependent test is an outcome other than the first outcome, omit updating of the access frequency tracking indicator corresponding to the given page; in which:
   the chance-dependent test comprises determining whether a test evaluating counter, for counting memory access requests, satisfies a predetermined condition; and
   the test evaluating counter is a global counter shared between all memory access requests.

2. The apparatus according to claim 1, in which the chance-dependent test has a software-configurable probability of providing the first outcome.

3. The apparatus according to claim 2, in which the software-configurable probability of providing the first outcome is dependent on at least one of:
   a software-configured global parameter shared between all memory access requests; and
   a software-configured local parameter specific to a particular subset of memory access requests including the given memory access request.

4. The apparatus according to claim 2, in which the software-configurable probability is specified in a software-configurable register.

5. The apparatus according to claim 1, in which:
   the access frequency tracking circuitry is configured to set a probability of the chance-dependent test providing the first outcome separately for different pages of the memory address space; and
   in response to a determination that a frequency of accesses to the given page has reached or exceeded a predetermined threshold, the access frequency tracking circuitry is configured to reduce a probability of the chance-dependent test providing the first outcome on subsequent instances of a memory access request requesting access to the given page.

6. The apparatus according to claim 1, in which the chance-dependent test comprises determining whether a random or pseudorandom number has a predetermined value.

7. The apparatus according to claim 1, in which the access frequency tracking indicator comprises a tracking flag; and
   when the outcome of the chance-dependent test is the first outcome and the tracking flag corresponding to the given page has a first value, the access frequency tracking circuitry is configured to set the tracking flag corresponding to the given page to specify a second value.

8. The apparatus according to claim 1, in which the access frequency tracking indicator comprises a multi-bit access frequency tracking counter; and
   when the outcome of the chance-dependent test is the first outcome, the access frequency tracking circuitry is configured to increment the multi-bit access frequency tracking counter corresponding to the given page.

9. The apparatus according to claim 1, in which the access frequency tracking structure comprises an access frequency tracking hardware structure comprising a plurality of entries each to store the access frequency tracking indicator for a corresponding page of the memory address space.

10. The apparatus according to claim 9, in which the access frequency tracking hardware structure is a translation lookaside buffer, and the plurality of entries are translation lookaside buffer entries each to store the access frequency tracking information and address translation information associated with the corresponding page.

11. The apparatus according to claim 1, in which the access frequency tracking structure comprises a memory-based data structure stored in the memory system.

12. The apparatus according to claim 11, in which the access frequency tracking structure comprises a linear data structure comprising a plurality of entries having addresses in a contiguous block of memory address space; and
   the access frequency tracking circuitry is configured to identify the entry of the linear data structure providing the access frequency tracking indicator corresponding to the given page based on an offset determined based on an address of the given page.

13. The apparatus according to claim 1, in which the access frequency tracking structure comprises a tree structure.

14. The apparatus according to claim 13, in which the tree structure is a page table structure comprising a plurality of page table entries for specifying address translation information for corresponding pages of the memory address space, the page table entry corresponding to the given page comprising the access frequency tracking indicator corresponding to the given page.

15. An apparatus comprising:
memory access circuitry to process memory access requests requesting access to a memory system; and
access frequency tracking circuitry responsive to a given memory access request requesting access to a given page of a memory address space, to:
determine an outcome of a chance-dependent test, where the outcome of the chance-dependent test, when determined for the given memory access request, is dependent on chance;
when the outcome of the chance-dependent test is a first outcome, update an access frequency tracking indicator corresponding to the given page within an access frequency tracking structure; and
when the outcome of the chance-dependent test is an outcome other than the first outcome, omit updating of the access frequency tracking indicator corresponding to the given page; in which:
the chance-dependent test comprises determining whether a test evaluating counter, for counting memory access requests, satisfies a predetermined condition; and
the test evaluating counter is one of a plurality of local counters each for counting memory access requests of a specific subset, and the chance-dependent test is based on the local counter which corresponds to a specific subset of memory access requests including the given memory access request.

16. The apparatus according to claim 15, in which the plurality of local counters correspond to specific subsets of memory access requests associated with different operating modes or execution states.

17. The apparatus according to claim 15, in which the plurality of local counters comprise a load counter for counting load memory access requests and a store counter for counting store memory access requests.

18. The apparatus according to claim 15, in which the plurality of local counters correspond to specific subsets of memory access requests requesting access to different regions or pages of the memory address space.

19. The apparatus according to claim 15, in which the plurality of local counters correspond to specific subsets of memory access requests requesting access to different pages of the memory address space.

20. An apparatus comprising:
memory access circuitry to process memory access requests requesting access to a memory system; and
access frequency tracking circuitry responsive to a given memory access request requesting access to a given page of a memory address space, to:
determine an outcome of a chance-dependent test, where the outcome of the chance-dependent test, when determined for the given memory access request, is dependent on chance;
when the outcome of the chance-dependent test is a first outcome, update an access frequency tracking indicator corresponding to the given page within an access frequency tracking structure; and
when the outcome of the chance-dependent test is an outcome other than the first outcome, omit updating of the access frequency tracking indicator corresponding to the given page; in which:
the chance-dependent test comprises determining whether a portion of bits has a predetermined value, the portion of bits comprising bits sampled from: one or more items of internal control information of the apparatus, or a serial pulse train derived from one or more analogue or digital signals of the apparatus.

\* \* \* \* \*